United States Patent
Sarkar et al.

(10) Patent No.: US 11,206,314 B2
(45) Date of Patent: Dec. 21, 2021

(54) METHOD, DEVICE, AND SYSTEM FOR PREDICTING AND CACHING USER ACTIVITY FOR SEAMLESS USER EXPERIENCE WITHIN VEHICLES

(71) Applicant: WIPRO LIMITED, Bangalore (IN)

(72) Inventors: Arnik Sarkar, Murshidabad (IN); Srimanta Kundu, Kolkata (IN); Sujeet Saha, Kolkata (IN)

(73) Assignee: Wipro Limited, Bangalore (IN)

( * ) Notice: Subject to any disclaimer, the term of this patent is extended or adjusted under 35 U.S.C. 154(b) by 962 days.

(21) Appl. No.: 15/911,598

(22) Filed: Mar. 5, 2018

(65) Prior Publication Data

US 2019/0222670 A1     Jul. 18, 2019

(30) Foreign Application Priority Data

Jan. 16, 2018   (IN) .............................. 201841001813

(51) Int. Cl.
| | |
|---|---|
| *H04L 29/08* | (2006.01) |
| *G06F 9/46* | (2006.01) |
| *H04W 4/40* | (2018.01) |
| *H04W 4/48* | (2018.01) |
| *G06N 20/00* | (2019.01) |
| *G06K 9/00* | (2006.01) |

(52) U.S. Cl.
CPC .......... *H04L 67/2857* (2013.01); *G06F 9/461* (2013.01); *G06K 9/00832* (2013.01); *G06N 20/00* (2019.01); *H04L 67/22* (2013.01); *H04L 67/2842* (2013.01); *H04W 4/40* (2018.02); *H04W 4/48* (2018.02); *H04L 67/12* (2013.01)

(58) Field of Classification Search
CPC . H04L 67/2857; H04L 67/2842; H04L 67/22; H04L 67/12; G06K 9/00832; G06N 20/00; H04W 4/48; H04W 4/40; G06F 9/461
See application file for complete search history.

(56) References Cited

U.S. PATENT DOCUMENTS

| | | |
|---|---|---|
| 8,316,098 B2 | 11/2012 | Luna et al. |
| 2002/0019899 A1 | 2/2002 | Tsai |
| 2007/0157234 A1* | 7/2007 | Walker .................. H04N 7/163 725/38 |
| 2008/0242280 A1* | 10/2008 | Shapiro ............ H04N 21/41407 455/414.3 |
| 2015/0370531 A1* | 12/2015 | Faaborg .................. G10L 15/30 704/275 |
| 2018/0007161 A1* | 1/2018 | Hwang .................. H04L 67/12 |
| 2018/0270179 A1* | 9/2018 | Wren .................. G06Q 30/0251 |

\* cited by examiner

*Primary Examiner* — Soe Hlaing
(74) *Attorney, Agent, or Firm* — Finnegan, Henderson, Farabow, Garrett & Dunner, LLP

(57) ABSTRACT

A method, device, and system for predicting and caching user activity for seamless user experience within vehicles is disclosed. The method includes identifying a contextual information based on current activity associated with a user within the vehicle. The method further includes retrieving predictive information from a remote server or a local cache within the vehicle, based on a type of the contextual information. The method includes rendering the predictive information to the user within the vehicle in response to retrieving. The method further includes capturing response of the user to the predictive information rendered to the user as a user feedback.

16 Claims, 8 Drawing Sheets

METHOD, DEVICE, AND SYSTEM FOR PREDICTING AND CACHING USER ACTIVITY FOR SEAMLESS USER EXPERIENCE WITHIN VEHICLES

TECHNICAL FIELD

This disclosure relates generally to vehicles and more particularly to method, device, and system for predicting and caching user activity for seamless user experience within vehicles.

BACKGROUND

With increase in technology and easy availability of technologically advanced vehicles, user experience plays a very important role while vehicles are being driven. Users, while driving the vehicle, want to have an uninterrupted and seamless experience, a major part of which is dependent on seamless network connectivity. As part of the concept of connected vehicles, there should be a seamless user experience in terms of data connectivity with the cloud. If due to network issues the network connection is not available or is intermittent, overall user experience is adversely affected. Some of the problems in the existing solutions is intermittent network connectivity, delay in network response, high network overhead, and cost overhead.

In conventional solutions, as network connectivity is frequently accessed, exchanging data over the network leads to consumption of high network bandwidth. This may slow-down the whole network and thus may indirectly affect quality of service for other user and vehicles. Moreover, frequent data exchange over network increases the overall cost while using such solutions.

SUMMARY

In one embodiment, a method for predicting and caching user activity within a vehicle is disclosed. The method includes identifying a contextual information based on current activity associated with a user within the vehicle. The method further includes retrieving predictive information from a remote server or a local cache within the vehicle, based on a type of the contextual information. The method includes rendering the predictive information to the user within the vehicle in response to retrieving. The method includes capturing response of the user to the predictive information rendered to the user as a user feedback.

In another embodiment, a user experience device for predicting and caching user activity within a vehicle is disclosed. The user experience device comprising a processor and a memory communicatively coupled to the processor, wherein the memory stores instructions, which on execution cause the processor to identify a contextual information based on current activity associated with a user within the vehicle. The instructions further cause the processor to retrieve predictive information from a remote server or a local cache within the vehicle, based on a type of the contextual information. The instructions cause the processor to render the predictive information to the user within the vehicle in response to retrieving. The instructions further cause the processor to capture response of the user to the predictive information rendered to the user as a user feedback.

In yet another embodiment, a system for predicting and caching user activity within a vehicle is disclosed. The system includes a user experience device that includes a processor and a memory communicatively coupled to the processor, wherein the memory stores instructions, which on execution cause the processor to identify a contextual information based on current activity associated with a user within the vehicle. The instructions further cause the processor to retrieve predictive information from a remote server or a local cache within the vehicle, based on a type of the contextual information. The instructions cause the processor to render the predictive information to the user within the vehicle in response to retrieving. The instructions further cause the processor to capture response of the user to the predictive information rendered to the user as a user feedback.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
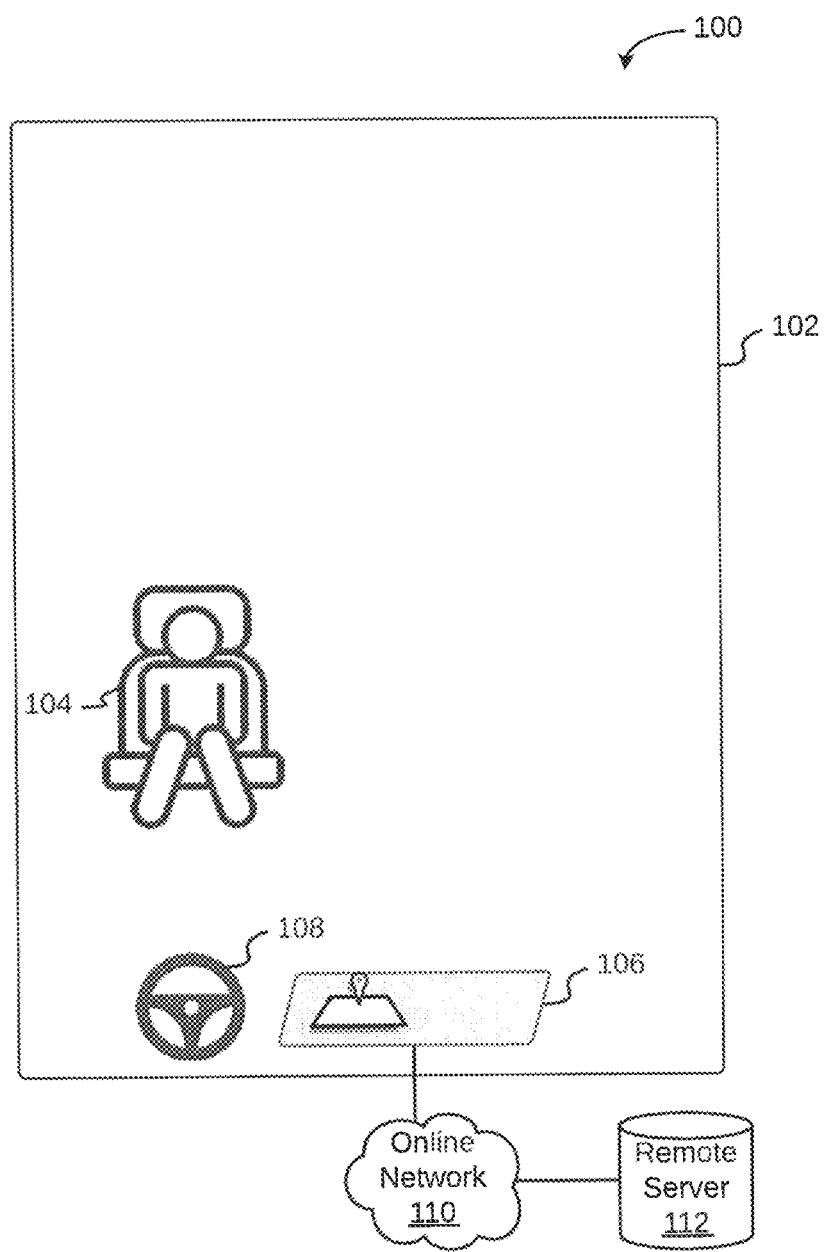
FIG. 1 is a block diagram illustrating an environment in which various embodiment may be employed.

Additional illustrative embodiments are listed below. In one embodiment, an environment 100 (that is exemplary) in which various embodiments may be employed is illustrated in FIG. 1. Environment 100 includes a vehicle 102 in which a driver 104 is sitting. Driver 104 may be accompanied by one or more passengers (not shown in FIG. 1). Vehicle 102 may be an autonomous vehicle. Examples of vehicle 102 may include, but are not limited to a car, bus, a truck, or a train.

Vehicle 102 may include an infotainment system 106, which may include an audio and video system and a navigation map that may be accessible to driver 102 or other passengers through various interfaces. Examples of such interfaces may include, but are not limited to touch screen interface, voice interface, keypad interface integrated with infotainment system 106, or button controls integrated within a steering wheel 108 of vehicle 102. Infotainment system 106 may additionally enable driver 104 or the passengers to control heating and air-conditioning system, deodorizer, audio system, ambient lights, fan seed, seat vibration system, or backrest heating system within vehicle 102.

Infotainment system 106 may access content, for example, audio files, video files, current traffic data, or road diversions, from an online network 110 based on availability of data connection. Online network 110 may be a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). Online network 110 may further be connected to a remote server 112 that may store data required or consumed by infotainment system 106. A continuous network connectivity and data availability ensures uninterrupted and seamless experience for driver 104 and the passengers inside vehicle 102. However, in case of a disruption in the network connectivity or data availability, user experience may be adversely affected. This problem is resolved by a system 200 that includes a user experience device 202. This is explained in detail in conjunction with FIG. 2

Figure 2:
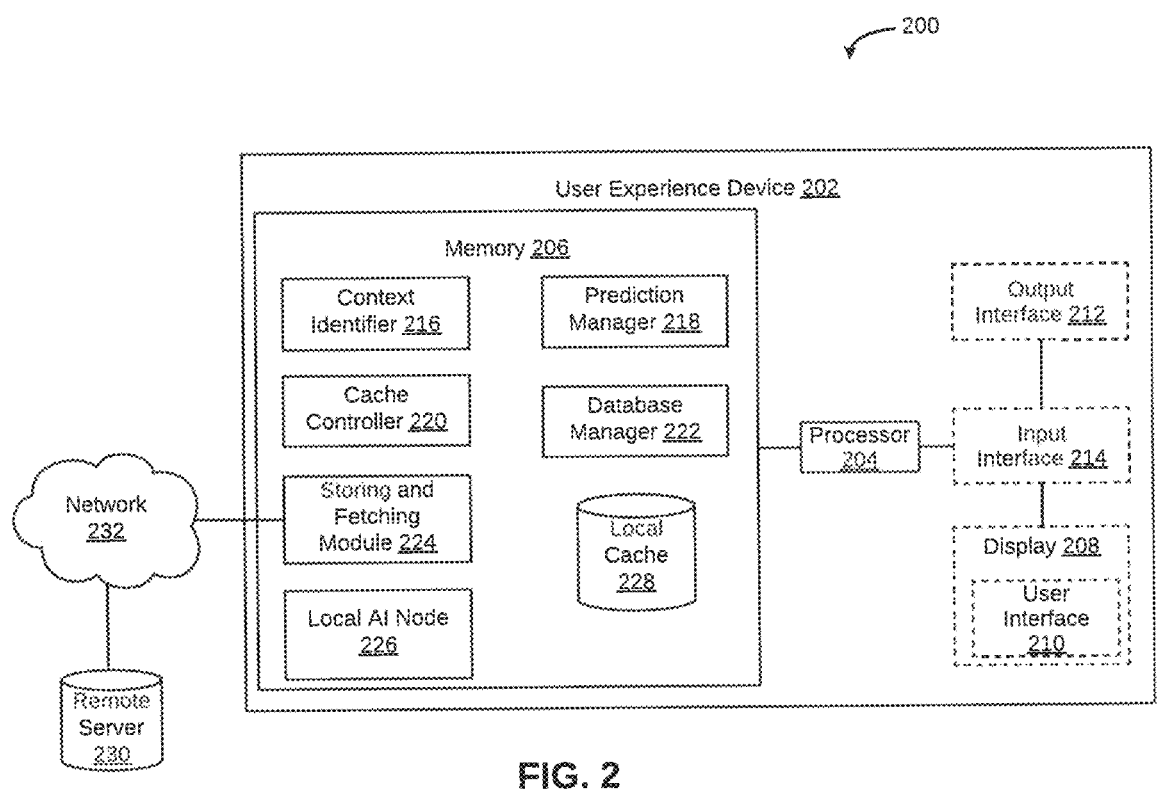
FIG. 2 is a block diagram illustrating a system that includes a user experience device for predicting and caching user activity within a vehicle, in accordance with an embodiment.

Referring now to FIG. 2, a block diagram of system 200 that includes user experience device 202 for predicting and caching user activity within a vehicle is illustrated, in accordance with an embodiment. User experience device 202, for example, may be an infotainment device. User experience device 202 includes a processor 204 that is communicatively coupled to a memory 206. Memory 206 may store instructions that may be executed by processor 204 to predict and cache user activity within the vehicle. Memory 206 may be volatile memory or non-volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random-Access Memory (DRAM), and Static Random-Access Memory (SRAM).

Processor 204 may further be coupled to a display 208 that includes a user interface 210. Display 208 may display various information that is intended to be presented to the user. Information may be rendered to the user by various other means, for example, sound or light, by way of an output interface 212. Output interface 212 may thus be a speaker or an LED light. In order to provide inputs to user experience device 202, user may interact with user interface 210, which may be a touch screen interface. Additionally, the user may use input interface 214, which is coupled to processor 204, to provide input to user experience device 202 via various means, for example, a keypad, a mic, a camera, or a joystick.

In order to predict and cache user activity within the vehicle, memory 206 includes a context identifier 216, a prediction manager 218, a cache controller 220, a database manager 222, a storing and fetching module 224, and a local Artificial Intelligence (AI) node 226. Context identifier 216 identifies contextual information based on current activity associated with the user within the vehicle. The current activity may include details associated with the vehicle and the user. These details may include one or more of, but is not limited to user profile, location of the vehicle, current day, weekday or weekend, time of the day, current weather, origin and destination, current date, vehicle make, or vehicle specifications. Current activity may also include user access of one or more applications within the vehicle. The one or more applications may include, but are not limited to navigation map, video player, audio player, FM radio, or contacts.

Based on a type of the contextual information, prediction manager 218 retrieves predictive information from a local cache 228 or a remote server 230. In order to retrieve predictive information from local cache 228, prediction manager 218 communicates with cache controller 220, which is the data manager unit and the main decision-making module in user experience device 202. Database manager 222 may further act as a communication bridge between cache controller 220 and local cache 228. Database manager 222 may be used to store and retrieve data from local cache 228, whenever required. This is further explained in detail in conjunction with FIGS. 3, 4A, and 4B.

Further, in order to retrieve predictive information from remote server 230, prediction manager 218 communicates with storing and fetching module 224, which retrieves the desired information from remote server 230, via network 232. Network 232 may be a wireless network and the examples may include, but are not limited to the Internet, WLAN, Wi-Fi, LTE, WiMAX, and GPRS. Remote server 230 may store multiple user profiles having user specific behavior and actions stored therein. This is further explained in detail in conjunction with FIGS. 3, 4A, and 4B.

Local AI node 226 further analyses the retrieved predictive information using light weight machine learning model to render relevant predictive information to the user. The predictive information may be rendered via one or more of display 208 or output interface 212 to the user. Local AI node 226 also captures response of the user to the predictive information as user feedback and thus initiates user feedback mechanism and proactively re-evaluates and trains the machine learning model. This is further explained in detail in conjunction with FIGS. 5 and 6.

Figure 3:
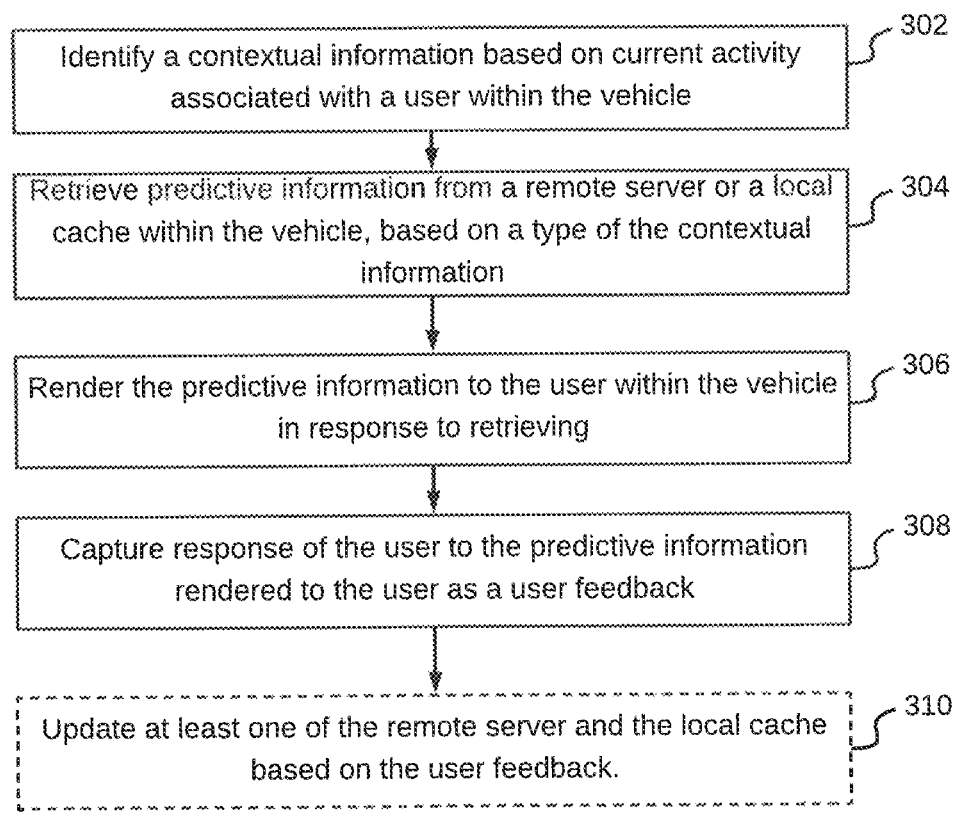
FIG. 3 illustrates a flowchart of a method for predicting and caching user activity within a vehicle, in accordance with an embodiment.

Referring now to FIG. 3, a flowchart of a method for predicting and caching user activity within a vehicle is illustrated, in accordance with an embodiment. When a user (passenger or driver 104) is sitting inside the vehicle, user experience device 202 may capture current activity of the user. The current activity may include details associated with the vehicle and the user and may include one or more of, but is not limited to user profile, location of the vehicle, current day, weekday or weekend, time of the day, current weather, origin and destination, current date, vehicle make, or vehicle specifications.

Current activity may also include user access of one or more applications within the vehicle. In this case, user experience device 202 may be an infotainment system and the current activity of the user may be captured based on user interaction with an interface of the infotainment system. The interface may be—a touch screen interface, a key pad interface, or a voice interface. The one or more applications may include, but are not limited to navigation map, video player, audio player, FM radio, or contacts.

Based on current activity associated with a user, user experience device 202 may identify a contextual information within the vehicle, at step 302. Contextual information represents needs of the user while driving the vehicle. When the current activity includes details associated with the vehicle and the user, the contextual information may include a global context Identifier (ID). By way of an example, when user starts a trip and switches on user experience device 202 (for example, an infotainment system), even before user access one or more applications, user experience device 202 may read the current location, day, or time for the vehicle to predict the trip for the user and applications that are frequently used on that trip. The global context ID is used to fetch this information.

However, when the current activity includes information regarding user access of one or more applications in user experience device 202, the contextual information may include one or more application context IDs associated with the one or more applications accessed by the user. As each application accessed by a user represent a unique context, contextual information for each application is assigned a unique context ID. By way of an example, while inside a car, a user may access a trip prediction application to get prediction regarding an upcoming trip. Additionally, while driving the car, the user may access a music application to listen to the songs of his preferred genre or may access an FM Traffic channel to get traffic updates. The user may also want to adjust climate inside the car. Thus, in this case, the contextual information may include context ID for each of the trip prediction application, the music application, an FM application, and the climate control application.

Based on a type of the contextual information, user experience device 202, at step 304, may retrieve predictive information from a remote server or a local cache within the vehicle. When the contextual information includes the global context ID, the predictive information may be retrieved from the remote server. However, when the contextual information includes one or more application context IDs, the predictive information may be retrieved either from the remote server or from the local cache. This is further explained in detail in conjunction with FIG. 4. The predictive information, for example, may include selection of songs to be played while driving, most suitable route to be taken based on current traffic information or surrounding scenic beauty, climate within the vehicle, the list of contacts whom user may want to call or text while on the trip, the news/traffic/FM radio channel user may like to listen to while on the trip, or trivia displayed on user experience device 202, while the vehicle is passing through prominent places.

User experience device 202 may then render the predictive information to the user within the vehicle at step 306. The predictive information may be rendered by way of display 208 integrated within user experience device 202 or as an audio output from speakers in user experience device 202. The user may then respond to the predictive information thus rendered. The response may either be a positive response or a negative response. By way of an examples, when a user accepts the predictive information, the response may be considered as positive and when the user rejects the predictive information the response may be considered as negative. By way of another example, the user may be prompted to provide a feedback after the predictive information is rendered. The user may accordingly provide a rating as to accuracy of the predictive information. The rating may be used to determine whether the user response is negative or positive, User experience device 202 may capture response of the user to the predictive information as a user feedback at step 308. Thereafter, at step 310, user experience device 202 may update one or more of the remote server and the local cache based on the user feedback. Updating of the remote server and the local cache after every user feedback enables increase in accuracy of the predictive information retrieved by user experience device 202. This is further explained in detail in conjunction with FIG. 5.

Figure 4A:
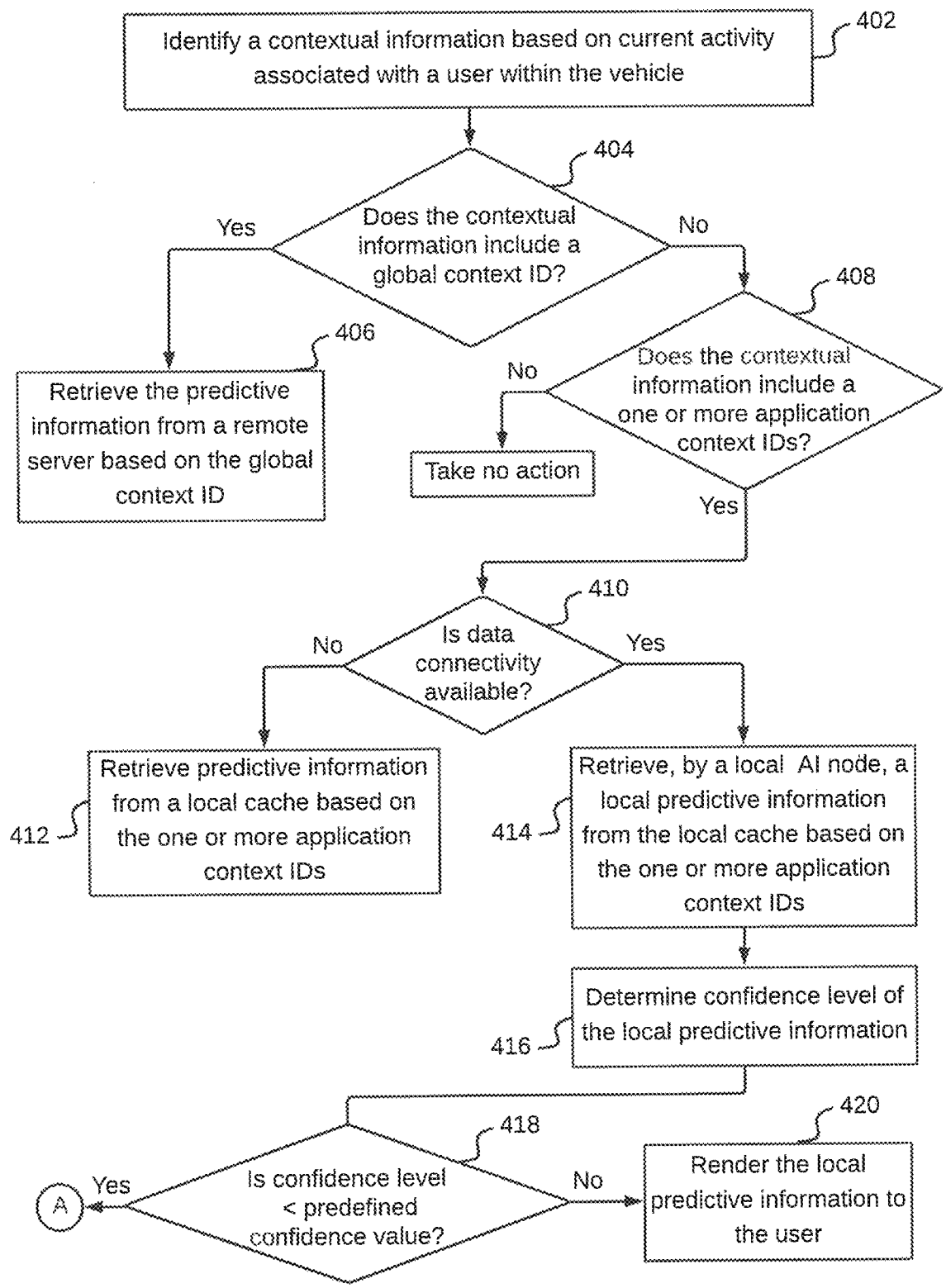
FIGS. 4A and 4B illustrate a flowchart of a method for retrieving predictive information from a local cache or a remote server, in accordance with an embodiment.
Figure 4B:
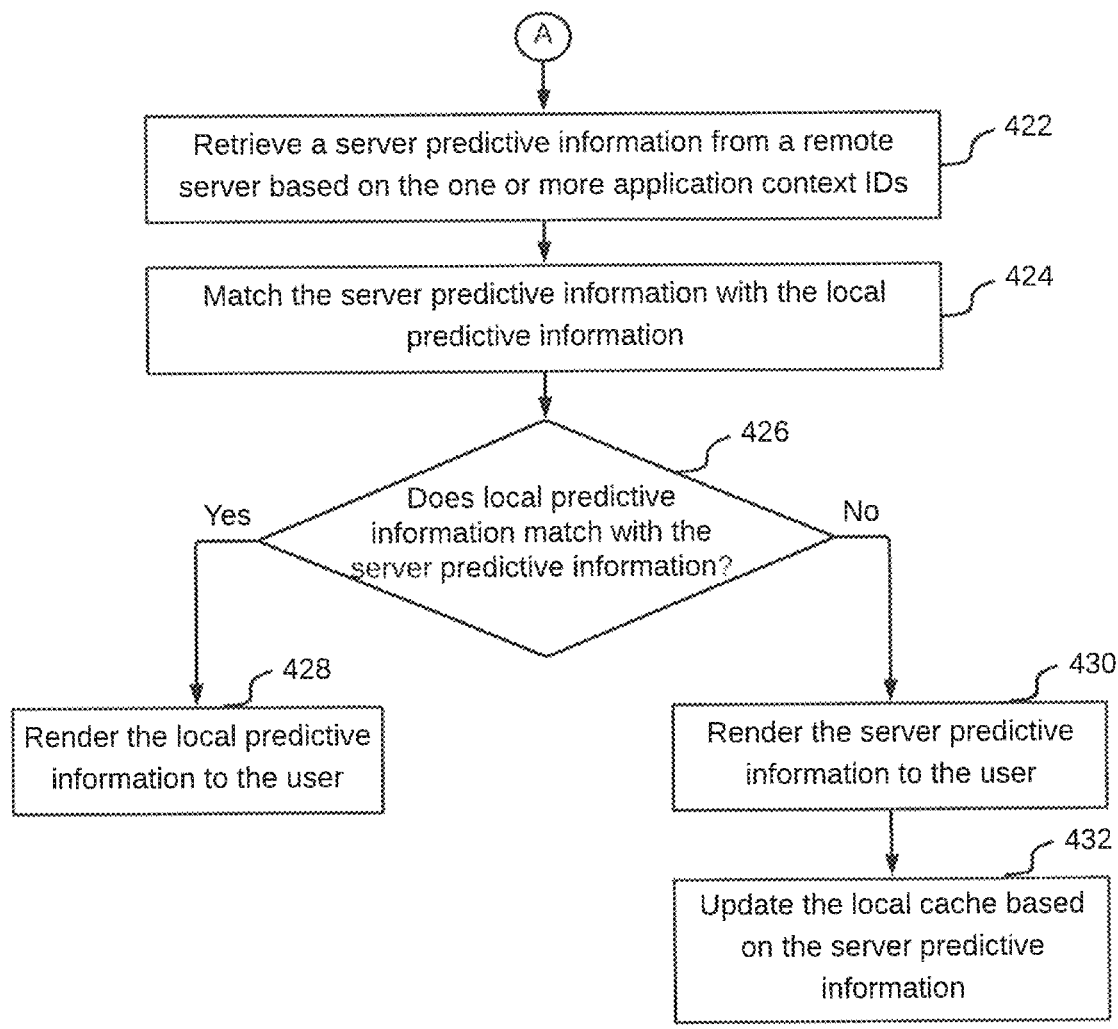

Referring now to FIGS. 4A and 4B, a flowchart of a method for retrieving predictive information from a local cache or a remote server is illustrated, in accordance with an embodiment. Based on current activity associated with a user within the vehicle, a contextual information may be identified at step 402. This has been explained in detail in conjunction with FIG. 3. At step 404, a check may be performed to determine whether the contextual information includes a global context ID. If the contextual information includes the global context ID, a check may be performed at step 406 to determine whether data connectivity is available or not. If data connectivity is not available, then no further action is taken. However, when data connectivity is available, one or more application context IDs that are local, may be retrieved from a remote server (for example, remote server 112), based on the contextual ID at step 408. In case user context device 202 fails to connect with the remote server, user context device 202 periodically retries to connect with remote server for a defined number of retry count.

Once the one or more application context IDs, which are local, are retrieved from the remote server, a check may be performed at step 410 to determine whether data connectivity is available or not. When data connectivity is not available, based on the contextual information, i.e., the one or more application context IDs, a local predictive information may be retrieved from the local cache, by a local AI node, at step 412. In an embodiment, in this case, a local database within user experience device 202 may be searched to find out if sufficient data is available in the local database for the current contextual information to retrieve the predictive information.

Referring back to step 410, when data connectivity is available, at step 414, the local AI node may retrieve the local predictive information from the local cache based on the contextual information, i.e., the one or more application context IDs. Thereafter, at step 416, confidence level of the local predictive information may be determined. In an embodiment, the confidence level may be determined in percentage. Alternatively, the confidence level may be determined in the form of ratings.

At step 418, a check may be performed to determine whether the confidence level is less than a predefined confidence value. The predefined confidence level, for example, may be fixed at 90%. When the confidence level is greater than or equal to the predefined confidence value, the local predictive information may be rendered to the user at step 420. By way of an example, when the confidence level is greater than or equal to 90%, the local predictive information is rendered to the user.

Referring back to step 418, when the confidence level of the local predictive information is less than the predefined confidence level, at step 422, a server predictive information may be retrieved from the remote server based on the contextual information. The server predictive information is fetched based on user behavior data present in the remote server and included in the contextual information. The remote server may include machine learning algorithm using which it will provide possible predictive information for user behavior. At step 424, the server predictive information may be matched with the local predictive information.

Thereafter, a check may be performed at step 426 to determine whether the local predictive information matches with the server predictive information or not. In case of a match, the local predictive information may be rendered to the user at step 428. In case of a mismatch, the server predictive information may be rendered to the user at step 430. The local cache may then be updated based on the server predictive information at step 432. While updating the local cache, weight assigned to the local AI node is further tuned, such that, the local predictive information retrieved by the local AI node matches with the server predictive information retrieved from the remote server. This tuning enables the local AI node to retrieve more accurate predictive information based on the contextual information.

Referring back to step 404, when the contextual information does not include the global context ID, a check may be performed at step 434 to determine whether the contextual information includes one or more application context IDs. If the contextual information does not include one or more application context IDs, no further action is taken. However, when the contextual information includes one or more application context IDs, the control goes to step 410.

Thus, user experience device 202 may selectively retrieve predictive information from the remote server or the local cache. As a result, problems existing in the current solutions, for example, delay in network response, high network overhead, and cost overhead are solved.

Figure 5:
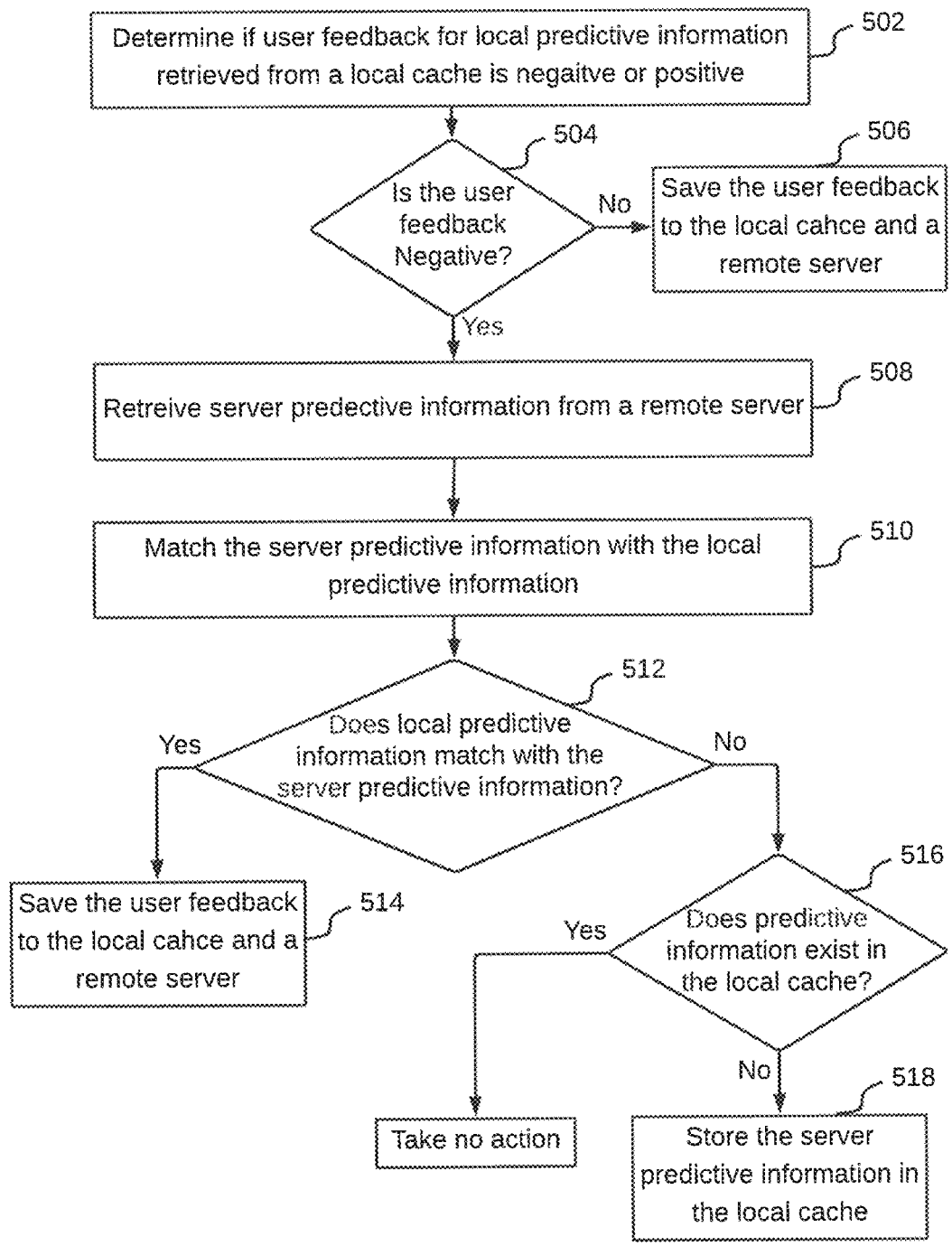
FIG. 5 illustrates a flowchart of a method for capturing user feedback to the predictive information rendered to the user, in accordance with an embodiment.

Referring now to FIG. 5, a flowchart of a method for capturing user feedback to the predictive information rendered to the user is illustrated, in accordance with an embodiment. Once the predictive information is rendered to the user, the user feedback is captured based on response of the user towards the predictive information. At step 502, it may be determined whether user feedback for local predictive information is negative or positive. At step 504, a check may be performed to determine whether the user feedback is negative. If the user feedback is positive, the user feedback may be saved to the local cache and the remote server at step 506.

However, when the user feedback is negative, server predictive information may be retrieved from the remote server at step 508. In an embodiment, the server predictive information is retrieved only when the local predictive information has a confidence level greater than the predefined confidence level or when the local predictive information was retrieved due to non-availability of data connectivity.

The server predictive information may then be matched with the local predictive information at step 510. Thereafter, at step 512, a check may be performed to determine whether the local predictive information matches with the server predictive information. In case of a match, the user feedback may be saved to the local cache and the remote server at step 514. In case, the sever predictive data is rendered to the user and the user feedback is negative, the user feedback may be saved to the remote server and the local cache.

Referring back to step 512, in case of a mismatch, at step 516, a check may be performed to determine whether predictive information exists in the local cache or not. In case the predictive information exists, no further action may be taken. However, in case of absence of the predictive information in the local cache, at step 518, the server predictive information may be stored in the local cache.

Figure 6:
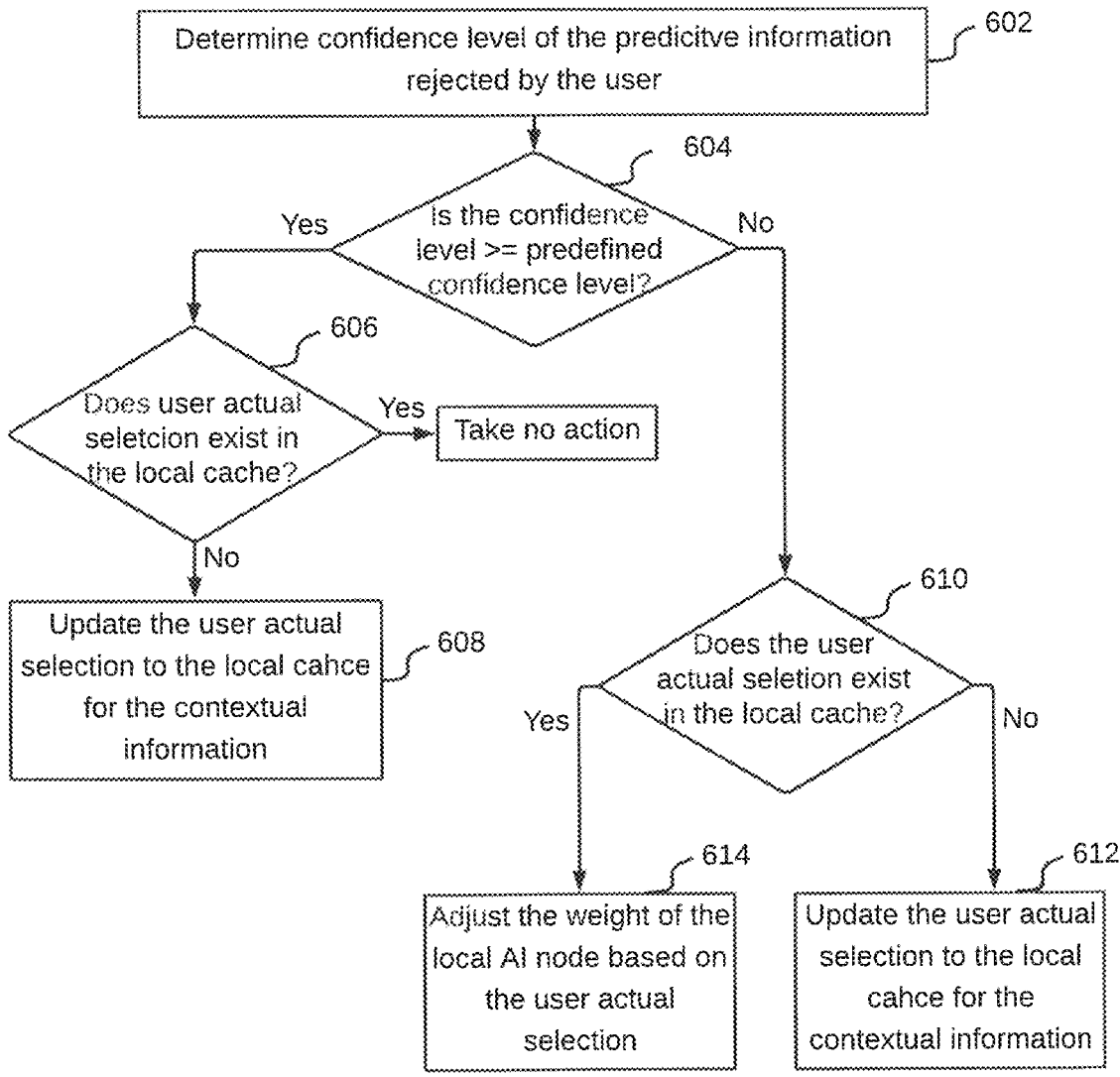
FIG. 6 illustrates a flowchart of a method for updating a local cache and training a local Artificial Intelligence (AI) node based on user feedback, in accordance with an embodiment.

Referring now to FIG. 6, a flowchart of a method for updating the local cache and training the local AI node based on user feedback is illustrated, in accordance with an embodiment. When the predictive information rendered to the user is not accepted by the user, user experience device 202 may further capture user behavior or actual user selection in response to rendering of the predictive information. By way of an example, a particular song may be played on a display of user experience device 202 as predictive information. The user may however reject this song and play a different song instead, via user experience device 202 (which may be an infotainment system). The different song in this case is the actual user selection.

In order to train user experience device 202 for retrieving accurate predictive information, at step 602, confidence level of the predictive information rejected by the user may be determined. At step 604, a check may be performed to determine whether the confidence level is greater than or equal to the predefined confidence level. If true, at step 606 a check may be performed to determine whether the actual user selection exists in the local cache. If the actual user selection exists, then no further action may be taken. However, when the actual user selection does not exist, at step 608, the user actual selection may be updated to the local cache for the contextual information.

Referring back to step 604, if the confidence level is less than the predefined confidence level, at step 610, a check may be performed to determine whether the actual user selection exists in the local cache. If the actual user selection does not exist in the local cache, at step 612, the user actual selection may be updated to the local cache for the contextual information. However, if the actual user selection exists in the local cache, at step 614, the weight assigned to the local AI node may be tuned based on the user actual selection. This ensures that the local predictive information retrieved by the local AI node would include the user actual selection next time the same contextual information is identified by user experience device 202. As a result, more accurate predictive information is rendered to the user.

Figure 7:
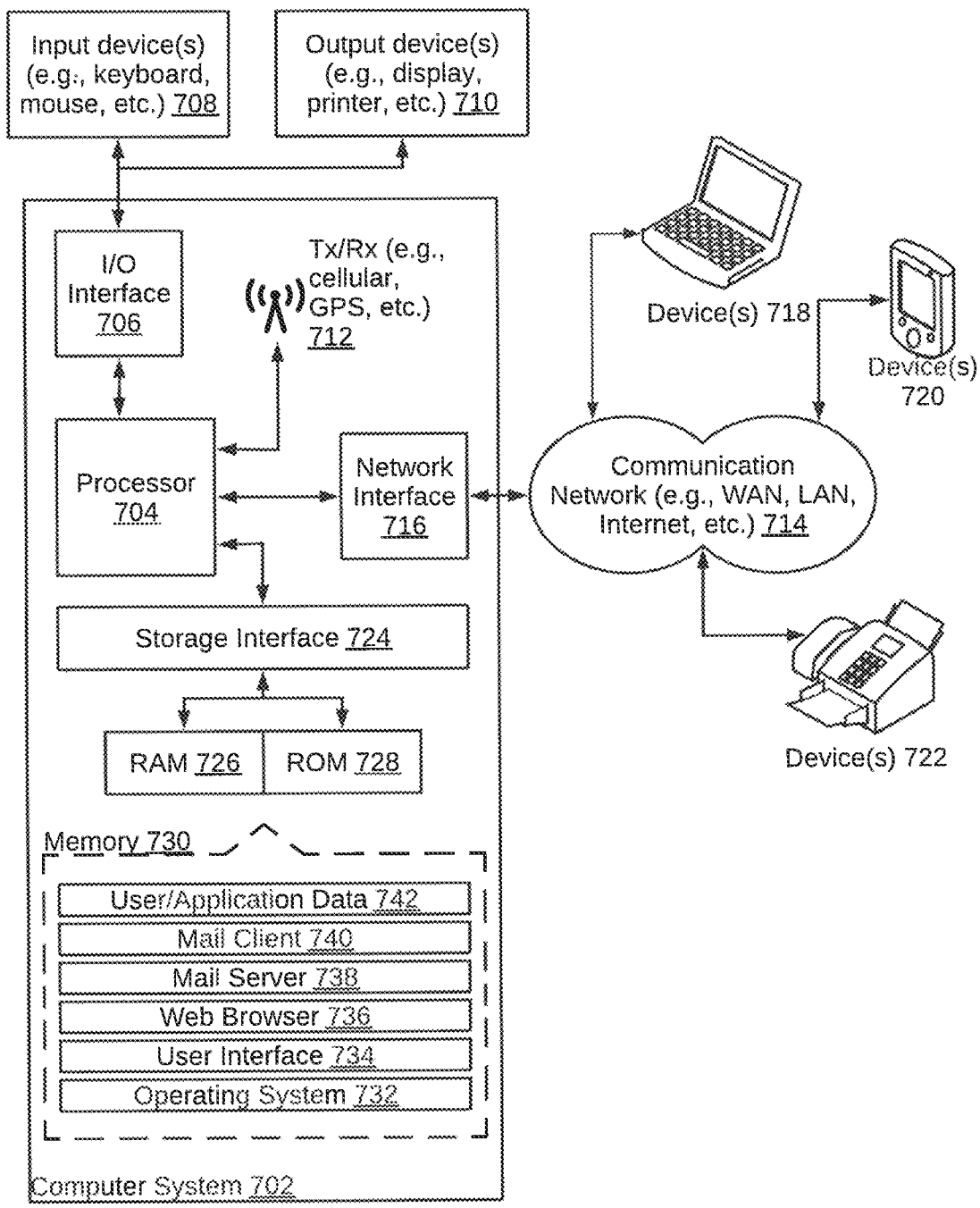
FIG. 7 illustrates a block diagram of an exemplary computer system for implementing various embodiments.

FIG. 7 is a block diagram of an exemplary computer system for implementing various embodiments. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI). RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOGGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as Internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYB- ASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method, device, and system for predicting and caching user activity for seamless user experience within vehicles. The device provides hassle free, seamless, and smoother experience of automotive infotainment to users inside a vehicle. The method enables independence from network connectivity to provide seamless experience. The device and system is easy to deploy into an infotainment system, ensures smoother driving experience, has low network overhead, and faster response. Moreover, the system and device is cost effective as well.

The specification has described provide method, device, and system for predicting and caching user activity for seamless user experience within vehicles. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for predicting and caching user activity within a vehicle, the method comprising:
   identifying, by a user experience device, a contextual information based on current activity associated with a user within the vehicle, wherein the contextual information comprises at least one application context Identifier (ID) associated with at least one application, and wherein the current activity comprises the user accessing the at least one application within the vehicle, wherein, when data connectivity is not available, a local predictive information is retrieved from the local cache based on the contextual information;
   retrieving, by the user experience device, predictive information from a remote server or a local cache within the vehicle, based on a type of the contextual information;
   rendering, by the user experience device, the predictive information to the user within the vehicle in response to retrieving; and
   capturing, by the user experience device, response of the user to the predictive information rendered to the user as a user feedback, wherein, when data connectivity is available, retrieving the predictive information comprises:
      retrieving, by a local Artificial Intelligence (AI) node, a local predictive information from the local cache based on the contextual information;
      determining confidence level of the local predictive information retrieved by the local AI node; and
      rendering the local predictive information to the user, when confidence value associated with the local predictive information is greater than or equal to a predefined confidence value.

2. The method of claim 1, wherein the contextual information comprises a global context ID, and wherein the current activity comprises details associated with the vehicle and the user.

3. The method of claim 2, wherein the details associated with the vehicle and the user comprises at least one of user profile, location of the vehicle, current day, weekdays, weekend, time of the day, current weather, origin and destination, current date, vehicle make, or vehicle specifications.

4. The method of claim 2, wherein the predictive information is retrieved from the remote server, when the contextual information comprises the global context ID.

5. The method of claim 1 further comprising:
   retrieving a server predictive information from the remote server based on the contextual information, when confidence level of the local predictive information is less than the predefined confidence value; and
   matching the server predictive information with the local predictive information.

6. The method of claim 5 further comprising rendering the local predictive information to the user, when the local predictive information matches with the server predictive information.

7. The method of claim 5 further comprising:
   rendering the server predictive information to the user, when the local predictive information does not match with the server predictive information; and updating the local cache based on the server predictive information.

8. The method of claim 1 further comprising updating at least one of the remote server and the local cache based on the user feedback.

9. A user experience device for predicting and caching user activity within a vehicle, the user experience device comprising:
a processor;
a memory communicatively coupled to the processor, wherein the memory stores instructions, which on execution cause the processor to:
identify a contextual information based on current activity associated with a user within the vehicle, wherein the contextual information comprises at least one application context Identifier (ID) associated with at least one application, and wherein the current activity comprises the user accessing the at least one application within the vehicle, wherein, when data connectivity is not available, a local predictive information is retrieved from the local cache based on the contextual information;
retrieve predictive information from a remote server or a local cache within the vehicle, based on a type of the contextual information;
render the predictive information to the user within the vehicle in response to retrieving; and
capture response of the user to the predictive information rendered to the user as a user feedback, wherein, when data connectivity is available, retrieving the predictive information comprises:
retrieving, by a local Artificial Intelligence (AI) node, a local predictive information from the local cache based on the contextual information;
determining confidence level of the local predictive information retrieved by the local AI node; and
rendering the local predictive information to the user, when confidence value associated with the local predictive information is greater than or equal to a predefined confidence value.

10. The user experience device of claim 9, wherein the contextual information comprises a global context ID, and wherein the current activity comprises details associated with the vehicle and the user.

11. The user experience device of claim 10, wherein the predictive information is retrieved from the remote server, when the contextual information comprises the global context ID.

12. The user experience device of claim 9, wherein the instructions further cause the processor to:
retrieve a server predictive information from the remote server based on the contextual information, when confidence level of the local predictive information is less than the predefined confidence value; and
match the server predictive information with the local predictive information.

13. The user experience device of claim 12, wherein the instructions further cause the processor to render the local predictive information to the user, when the local predictive information matches with the server predictive information.

14. The user experience device of claim 12, wherein the instructions further cause the processor to:
render the server predictive information to the user, when the local predictive information does not match with the server predictive information; and
update the local cache based on the server predictive information.

15. The user experience device of claim 9, wherein the instructions further cause the processor to update at least one of the remote server and the local cache based on the user feedback.

16. A system for predicting and caching user activity within a vehicle, the system comprising:
a user experience device comprising:
processor;
a memory communicatively coupled to the processor, wherein the memory stores instructions, which on execution cause the processor to:
identify a contextual information based on current activity associated with a user within the vehicle, wherein the contextual information comprises at least one application context Identifier (ID) associated with at least one application, and wherein the current activity comprises the user accessing the at least one application within the vehicle, wherein, when data connectivity is not available, a local predictive information is retrieved from the local cache based on the contextual information;
retrieve predictive information from a remote server or a local cache within the vehicle, based on a type of the contextual information;
render the predictive information to the user within the vehicle in response to retrieving; and
capture response of the user to the predictive information rendered to the user as a user feedback, wherein, when data connectivity is available, retrieving the predictive information comprises:
retrieving, by a local Artificial Intelligence (AI) node, a local predictive information from the local cache based on the contextual information;
determining confidence level of the local predictive information retrieved by the local AI node; and
rendering the local predictive information to the user, when confidence value associated with the local predictive information is greater than or equal to a predefined confidence value.

* * * * *